Figure 1:
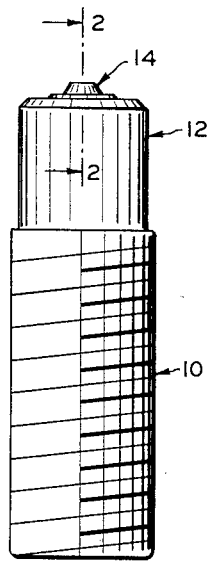

March 5, 1957 F. K. KELEMEN 2,784,014
FLUX-FILLED ARC WELDING STUD
Filed May 5, 1950

INVENTOR
Frank K. Kelemen
BY
Charles Mikulka
ATTORNEY

United States Patent Office 2,784,014
Patented Mar. 5, 1957

2,784,014

FLUX-FILLED ARC WELDING STUD

Frank K. Kelemen, Haddonfield, N. J., assignor to KSM Products, Inc., Merchantville, N. J., a corporation of New Jersey Application May 5, 1950, Serial No. 160,179

3 Claims. (Cl. 287—20.2)

This invention relates to stud welding, and more particularly to improved flux-filled studs of the type wherein the fluxing material is a self-sustaining cohesive mass of ductile metal.

Fundamentally the end welding of studs to a plate or other metallic body consists in creating between the stud and the body an electric arc of sufficient intensity to raise the parts adjoining the arc gap to a welding temperature and then pressing these molten parts into intimate contact with one another. This cycle of operations, performed semiautomatically by modern welding equipment, requires but a fraction of a second for its completion. In the operation of such equipment, the flux-filled weld end of the stud is brought into contact with the surface of the stud-receiving body or plate. Welding current is passed from the stud to the body and almost immediately thereafter the stud is lifted to strike the arc. The lift of the stud and the arcing period are automatically controlled by the welding gun and at the completion of the arcing period the current is shut off and the stud end plunged into engagement with the stud-receiving body. The rapid and forcible plunging of the stud end into the crater of metal in the stud-receiving body brings into contact the unmelted surfaces of the body and stud to produce a dense weld at their area of contact. The displaced molten lead is formed into a fillet around the weld area by a ceramic arc shield which surrounds the weld end of the stud throughout the weld cycle, being held by the welding gun in continuous engagement with the surface of the stud-receiving body.

The fluxing agent carried by the weld end of the stud serves several important functions in the formation of a proper weld. It acts, for example, as the arc initiator and serves as a scavenger of oxygen. In the type of flux-filled stud comprehended by the present invention, a solid cohesive mass of ductile metal, e. g., aluminum or titanium, is firmly secured in the stud end by having a portion of the mass thereof embedded in a suitable recess in said end. The shape and concentration of the entire flux charge, especially of the protruding portion thereof in relation to the weld end of the stud, is of the utmost importance in assuring the achievement of good, dense welds. Especially important is the shape of the tip of the fluxing charge which first contacts the metallic body to which the stud is to be welded and completes the circuit for the flow of welding current.

It is accordingly one object of the present invention to provide a novel flux-filled stud having its flux charge in the form of a cohesive mass of ductile metal loaded in part into a recess in the weld end of the stud and so shaped and concentrated as to assure dense welds without misfires.

It is another object of the present invention to provide a flux-filled stud of the above type wherein the tip thereof is suitably provided with a flattened area for assuring the establishment of the desired contact between the flux tip and the metallic body to which the stud is to be welded.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

Figure 2:
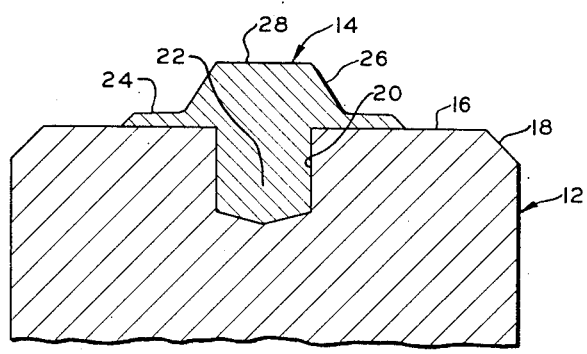

For a fuller understanding of the nature and objects of the invention, reference should be had to the following detailed description taken in connection with the accompanying drawing wherein:

Figure 1 is an end elevation view of one type of flux-filled stud embodying the improved structure of the present invention; and Fig. 2 is a cross-sectional view taken substantially along the line 2—2 of Fig. 1 and illustrating in detail the novel flux-loading of the stud of Fig. 1.

Referring now to Figure 1 there is illustrated, by way of example, one type of flux-filled stud comprehended by the present invention, which, as shown, comprises a shank 10, a welding end 12 and a flux charge 14 centrally carried by said end. The shank 10 of the stud is shown as of standard threaded construction capable of suitably receiving a nut for bolting down flooring or the like. It is to be expressly understood, however, that the present invention primarily is concerned with the relation between the weld end 12 of the stud and the flux charge 14, and is not to be construed as being limited to any specific type of shank construction. The shank portion 10 of the stud may, for example, be an eye-bolt, a metal lath, a hook, a lagging, a stirrup, or the like.

As illustrated in greater detail in Fig. 2, the weld end 12 has a substantially flat end surface 16 and is preferably provided with a slight chamfer 18. A recess 20, drilled or otherwise suitably formed in the central portion of the weld end 12, receives the root portion 22 of the flux charge 14. The latter, in accordance with the present invention, has, in addition to said root portion, a protruding part which includes a base portion 24 and a tapering, e. g., frusto-conical, portion 26 having a flat tip surface 28. The flatness of the latter surface bears a predetermined novel relation to the cross-sectional area of the weld end of the stud as will be more fully set out hereinafter.

One preferred method of shaping and securing the flux charge 14 in the weld end of the stud is to hammer, in a single stroke, a pellet of the ductile fluxing material, e. g., aluminum or titanium, into the recess 20, the hammer being provided with a suitable cooperating recess adapted to impart to the protruding end of the flux its desired configuration. A portion of the flux charge depending on the inclination of the sides of the tapering portion 26 overflows edgewise to provide the base or overflow portion 24. It will be apparent that the flux charge is subject to precise formation by controlling the size and shape of recess 20, the size and shape of the recess in the driving end of the hammer for forcing the flux charge into position, and the mass of the pellet of fluxing material.

In accordance with the present invention the root portion 22 of the flux charge, as determined by the depth of recess 20, is less than and is preferably approximately one-half of the expected diminution in length of the stud during the welding operation. This diminution, resulting from the melting of the weld end of the stud, is, according to established welding procedures, substantially independent of the cross-sectional area of the weld end. It varies from approximately three-thirty-seconds of an inch to one-eighth of an inch so that the root portion 22 of the flux charge preferably varies from one-thirty-second to one-sixteenth of an inch and is always less than three-thirty-seconds of an inch.

Protruding portion 24, 26 constitutes at least half of the mass of the flux charge and is preferably concentrated as closely as possible to end surface 16 being spread laterally at its base 24 a substantial distance beyond the recess 20. In practice, the distance between end surface 16 of the stud proper and surface 28 of the flux charge, i. e., the height of protruding portion 24, 26 of the flux charge, does not appreciably exceed one-sixteenth of an inch and is preferably three-sixty-fourths of an inch or less. This is very desirable because the rapid disintegration of the flux charge obtained during the initial stages of the drawing of the arc changes the arc length and too great a change in arc length, especially at this early stage, has an adverse effect on the character of the weld.

The inclination of the tapering portion 26 of the flux charge may be varied substantially. For example, the angle included between the tapering sides of said portion may vary from as little as 30° to as much as 130° and it will be readily appreciated that the smaller the included angle for a given diameter of tip surface 28 the greater will be the concentration of fluxing material in the base or overflow portion 24 of said charge. Because of this the lesser angularity is somewhat preferred, the minimum allowable angularity being determined essentially by the requirement that the hammer or other instrument which shapes and positions the flux pellet shall have its recess suitably inclined so that it may be readily withdrawn after the formation and positioning of the flux charge without dislodging the latter from the weld end. It is also to be noted that by having the angle included between the sides of tapering portion 26 large enough protruding portion 24, 26 of the flux charge may have base portion 24 thereof a continuous extension of said tapering portion. Accordingly, it is to be expressly understood that the subsequent reference herein to the base portion of the flux charge, except where otherwise characterized, is to be construed as including within its scope a continuous extension of the tapering portion 26.

Of utmost importance in assuring optimum welding results is the flatness of tip surface 28 whose diameter is not less than one-eighth of the diameter of the maximum cross-sectional area of the weld end of the stud, i. e., the diameter of the stud end 12 at the foot of the chamber 18.

The term "diameter" is used herein as a measure of circular as well as noncircular surface areas and is, accordingly, not to be construed as limiting the area to which it is applied to a circular shape. When used in connection with the area of the tip surface of the flux charge or the cross-sectional area of the weld end of the stud, the term "diameter" is to be understood as meaning the diameter of a circle equivalent in area to said area. In general, however, the tip surface 28 and the cross-sectional area of the weld end of the stud will be substantially circular in configuration.

The importance of the specified flatness of the tip surface 28 in giving uniform welding results and preventing apparent misfires has been empirically established. It is believed to be attributable to the fact that the flatness of the surface produces a greater cross-sectional area of contact for the transmission of the welding current during the initial stages of the welding operation and thereby prevents any possible partial fusion of the flux tip prior to arcing. Previously it has been the practice to point up the tip of the flux charge. However, this is a difficult operation to control within the required tolerances in large quantity production and if the operation is not precisely performed there is apparently a premature localized and limited fusion of the fluxing material. This fusion results in an adhesion between the stud-receiving body and the fluxing charge sufficient to prevent the lifting of the stud during the first stage of the welding operation and gives the effect of a misfire. By providing a flat surface in combination with the other structural characteristics of the flux charge noted hereinabove, uniform dense welds are assured.

The mass of fluxing material contained in each flux charge will vary for different size studs, being in general a function of the cross-sectional area of the weld end of the stud. To illustrate, it has been found satisfactory, in using aluminum as the fluxing agent, to employ pellets one-twenty-thousandths of a pound in weight for studs one-quarter of an inch in diameter, pellets approximately one-fifteen-thousandths of a pound in weight for studs three-eighths of an inch in diameter, and pellets approximately one-ten-thousandths of a pound in weight for studs one-half an inch in diameter.

Since certain changes may be made in the above product without departing from the scope of the invention herein involved, it is intended that all matter contained in the above description, or shown in the accompanying drawing, shall be interpreted as illustrative and not in a limiting sense.

What is claimed is:

1. A flux-filled welding stud having a flux charge consisting of a cohesive, solid mass of ductile fluxing metal substantially centrally supported in the weld end of the stud proper said weld end having a recess formed therein and a substantially flat end surface surrounding the open end of said recess, said mass of fluxing metal comprising a root portion contained within said recess and a protruding portion which includes a base portion adjacent said end surface and substantially greater in diameter than the diameter of said recess, a tapering portion widest adjacent said base portion, and a flat tip surface at the converging end of said tapering portion, the diameter of said tip surface being greater than one-eighth the diameter of the maximum cross-sectional area of said weld end, said protruding portion constituting more than one-half of the total mass of said fluxing metal.

2. The flux-filled welding stud of claim 1 wherein the fluxing metal is aluminum.

3. The flux-filled stud of claim 1 wherein the fluxing metal is titanium.

References Cited in the file of this patent
UNITED STATES PATENTS

| | | |
|---|---|---|
| 1,410,421 | Steele et al. | Mar. 21, 1922 |
| 1,703,541 | Pierson | Feb. 26, 1929 |
| 2,268,416 | Nelson | Dec. 30, 1941 |
| 2,402,659 | Nelson | June 25, 1946 |

FOREIGN PATENTS

| | | |
|---|---|---|
| 633,014 | Great Britain | Dec. 5, 1949 |